United States Patent [19]

LoStracco

[11] Patent Number: 5,607,532
[45] Date of Patent: Mar. 4, 1997

[54] USE OF ULTRAVIOLET-CURABLE ADHESIVE IN PREPARATION OF OPTICAL FIBER DISPENSERS

[76] Inventor: Gregory LoStracco, 1926 N. Tucker Dr., Tucson, Ariz. 85716

[21] Appl. No.: 478,304

[22] Filed: Jun. 7, 1995

[51] Int. Cl.⁶ ........................................ G02B 6/04
[52] U.S. Cl. ................ 156/169; 242/173; 156/273.3
[58] Field of Search ............................. 242/172, 173, 242/159; 156/173, 175, 169, 425, 428, 429, 273.3, 273.5, 275.5, 275.7

[56] References Cited

U.S. PATENT DOCUMENTS

| | | | |
|---|---|---|---|
| 3,922,426 | 11/1975 | Feltzin | 428/295 |
| 5,161,208 | 11/1992 | Christie et al. | 242/173 |
| 5,186,781 | 2/1993 | Verville | 242/173 |
| 5,220,632 | 6/1993 | LoStracco | 242/173 |

Primary Examiner—Michael W. Ball
Assistant Examiner—Michael A. Tolin
Attorney, Agent, or Firm—Charles D. Brown; Wanda K. Denson-Low

[57] ABSTRACT

An optical fiber pack (42) having layers (52) of optical fiber (22) is formed on a bobbin (32) using an ultraviolet-curable adhesive. A layer (50) of a UV-curable adhesive is deposited, and a length of the optical fiber (52) is wound over the layer (50) of ultraviolet-curable adhesive. Ultraviolet radiation is directed at the layer (50) of ultraviolet-curable adhesive through the layer (52) of optical fiber wound over the layer (50) of adhesive, to cure the adhesive. The approach can be used, for example, to apply adhesive to entire layers of the optical fiber, or to tack the ends of the optical fiber layers into place.

18 Claims, 4 Drawing Sheets

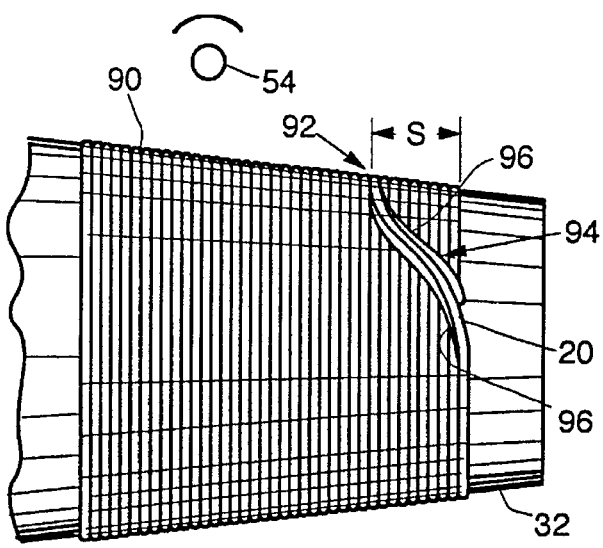
FIG. 8.
FIG. 9.
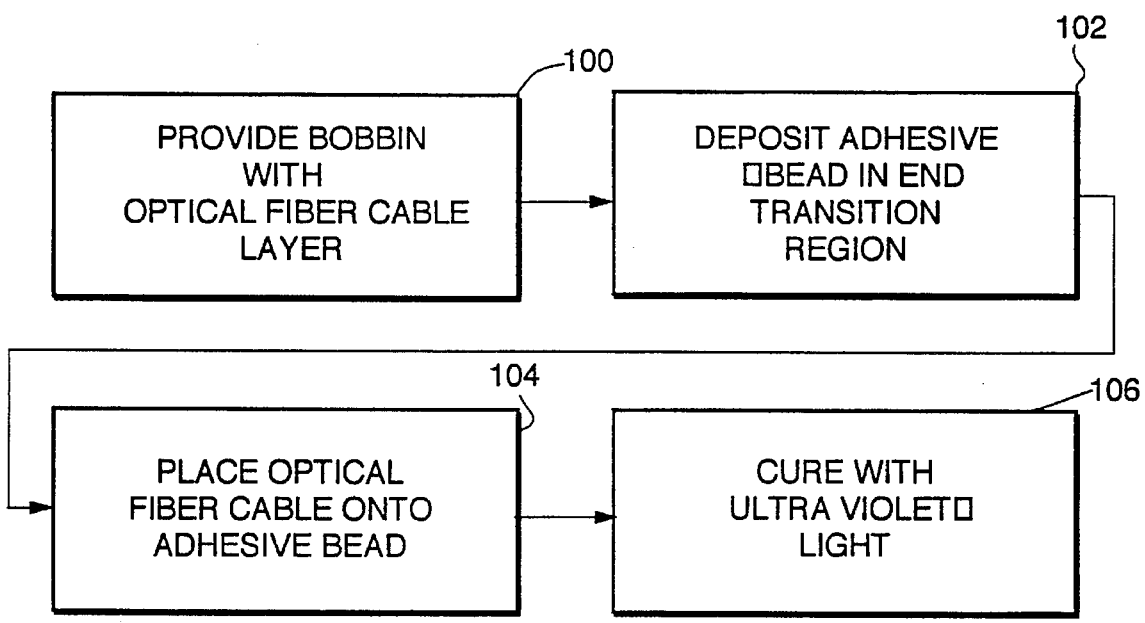

USE OF ULTRAVIOLET-CURABLE ADHESIVE IN PREPARATION OF OPTICAL FIBER DISPENSERS

BACKGROUND OF THE INVENTION

This invention relates to optical fibers, and, more particularly, to the fabrication of a dispenser that holds the optical fiber and permits its rapid payout when needed.

Optical fibers are strands of glass fiber processed so that light transmitted therethrough is subject to total internal reflection. Glass optical fibers are typically lab fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer is about 250 micrometers (approximately 0.010 inches). (The combination of optical fiber and buffer is sometimes termed an "optical fiber cable". As used herein, the term "optical fiber" includes both the glass optical fiber and the combination of optical fiber and buffer, except where it is clear from the context that the term refers only to the glass component.)

For such very fine optical fibers, the handling of the optical fiber to avoid damage that might reduce its mechanical strength and/or light transmission properties becomes an important consideration. In one approach, the optical fiber is wound onto a cylindrical or tapered cylindrical bobbin (collectively termed herein a "tapered" cylindrical bobbin, even though the angle of the taper may be zero) with many turns adjacent to each other in a side-by-side fashion. After one layer is complete, another layer of optical fiber is laid on top of the first layer, and so on. A weak adhesive is typically applied to the layers of optical fiber to hold them in place. The final assembly of the bobbin and the wound layers of optical fiber is termed a dispenser, and the mass of wound optical fiber is termed the fiber pack. When the optical fiber is later to be used, the optical fiber is paid out from the dispenser in a direction generally parallel to the axis of the tapered cylinder.

The adhesive is an important component of the system. In its final form it must be sufficiently strong to maintain the physical integrity of the optical fiber pack, but sufficiently weak to permit the turns and layers of optical fiber to be removed from the optical fiber pack during payout, without damaging any portion of the optical fiber. In the most common approach, the adhesive is dissolved, dispersed, or suspended in a liquid and supplied in a fluid, flowable form for application. The adhesive can be applied prior to winding the optical fiber, concurrently with the winding, or subsequent to the winding of a layer of the optical fiber. Some of the solvent typically evaporates during deposition of the adhesive. After the entire fiber pack of many layers of optical fiber is formed, the adhesive is cured to remove the remaining solvent and harden the adhesive to its solid, cured state. Curing can be accomplished by any of several approaches, such as the addition of a catalyst, condensation, or heating.

In an alternative approach, an adhesive curable by ultraviolet radiation has been used. The adhesive is comprised of fully (100 percent) reactive, solventless material that is applied to a layer of optical fiber after it is wound onto the underlying optical fiber pack. The adhesive is cured with ultraviolet radiation. The next layer of optical fiber is wound overlying the cured adhesive, and the process is repeated as necessary to build up the fiber pack.

There are important drawbacks to each approach. One uses solvents that may damage the buffer of the optical fiber and are also potential sources of environmental pollution when evaporated. When solvent-dispersed adhesives are used, voids may remain in the fiber pack after curing, because the adhesive/fluid preparation is typically greater than 90 percent by volume of liquid. There may also be other types of optical fiber pack defects resulting from heating the dispenser during curing. For the case of the ultraviolet-curable adhesive, the hardened adhesive layer is not a good substrate for the winding of the next overlying optical fiber layer. The next optical fiber layer typically does not lie in a regular pattern between the turns of the prior layer, but instead may have various types of winding irregularities.

There is therefore a need for an improved approach to the preparation of optical fiber dispensers. The present invention fulfills this need, and further provides related advantages.

SUMMARY OF THE INVENTION

The present invention provides an improved approach for the preparation of optical fiber dispensers, and the dispensers made by this approach. The optical fiber dispensers are built up in an incremental, progressive fashion which ensures that each new section resides on a stable base. Rework of the optical fiber pack during winding, in the event of a winding flaw, is simplified. Preferably, the adhesive utilizes no solvent, avoiding potential damage to the buffer coating by solvent attack and avoiding the need to dispose of the solvent after it evolves. The adhesive may be applied with any of a variety of techniques.

In accordance with the invention, a method for preparing an optical fiber dispenser comprises the steps of providing a bobbin and forming an optical fiber pack having layers of optical fiber on the bobbin. The step of forming includes the steps of depositing an adhesive layer of an adhesive curable by ultraviolet radiation, winding a length of the optical fiber over the layer of ultraviolet-curable adhesive to form an overlying optical fiber layer, and directing ultraviolet radiation at the adhesive layer through the overlying optical fiber layer, to cure the adhesive.

The invention can be implemented in several ways. In one approach, a layer of the adhesive is deposited along an entire length over which a layer of optical fiber is to be wound. The optical fiber layer is wound. The adhesive is cured by directing ultraviolet radiation through the overlying layer of optical fiber. This procedure can be extended to two or more alternating depositions of a layer of adhesive and winding of an optical fiber, and then curing the various layers of adhesive through the overlying layers in a single curing operation.

In another implementation, a relatively small region of adhesive is deposited at the end of a layer of optical fiber. The transition region between an optical fiber layer and the next layer overlying it is wound onto the small region of adhesive, and the adhesive is rapidly cured by exposure to ultraviolet radiation through the overlying optical fiber material. This procedure "tacks" the transition region into place.

In yet another implementation, a layer of the ultraviolet-curable adhesive is deposited onto the surface of the bobbin. A first layer of the optical fiber is wound overlying this layer, and the adhesive is cured by directing ultraviolet radiation through the overlying layer. This procedure produces a self-forming base layer for the wound layers of optical fiber.

For any of these implementations, the bobbin may be made of a material such as quartz that is transparent to ultraviolet radiation. Curing of the adhesive can be accomplished by directing ultraviolet radiation outwardly through the bobbin, inwardly from the outer surface of the optical fiber pack, or both.

For all of these approaches, it is preferred that the ultraviolet-curable adhesive be substantially solventless. That is, in prior approaches the adhesives are normally dissolved in a solvent for application to the fiber pack, typically with only about 5–15 volume percent adhesive in the solvent. In the present case, the adhesive is preferably 100 percent reactive, without solvent. That is, all of the monomers present in the liquid state are polymerized into a solid. Consequently, there is no need to remove and process the solvent for release to the environment, nor is there the possibility for trapping solvent or voids within the fiber pack during curing. A more dense fiber pack is produced. The preferred adhesive is a polymerizable material such as a urethane acrylate or a silicone.

The present invention provides an important advance in the art of optical fiber dispenser production. The dispenser is made in a progressive fashion wherein the adhesive is cured by ultraviolet light. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 8 is a schematic plan view of the dispenser of FIG. 2, at the location of an end transition between optical fiber layers; and FIG. 9 is a block flow diagram for the tacking of an optical fiber transition.

DETAILED DESCRIPTION OF THE INVENTION

Figure 1:
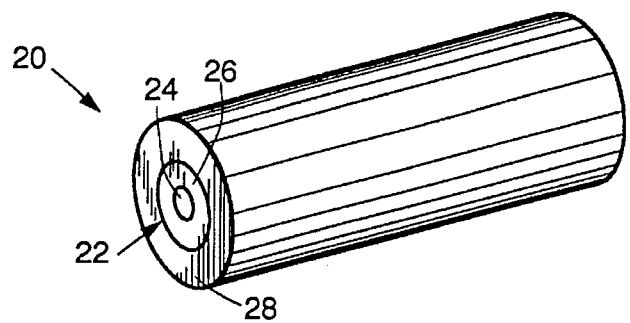
FIG. 1 is a schematic sectional view of an optical fiber.

FIG. 1 depicts an optical fiber cable 20. The optical fiber cable 20 includes an optical fiber 22 formed of a central core 24 and a cladding 26 overlying the core. The core 24 and the cladding 26 are glass. An optical signal is carried along the core 24. Overlying the optical fiber 22 is a buffer layer 28.

The buffer layer 28 is formed of a polymer material that protects the optical fiber 22 from being scratched or otherwise damaged. In a typical instance, the outer diameter of the cladding 26 is about 125 micrometers, and the outer diameter of the buffer layer 28 is about 250 micrometers. Other sizes of optical fiber cables 20 are also known, and the use of the present invention is not limited to any particular size of cable.

Figure 2:
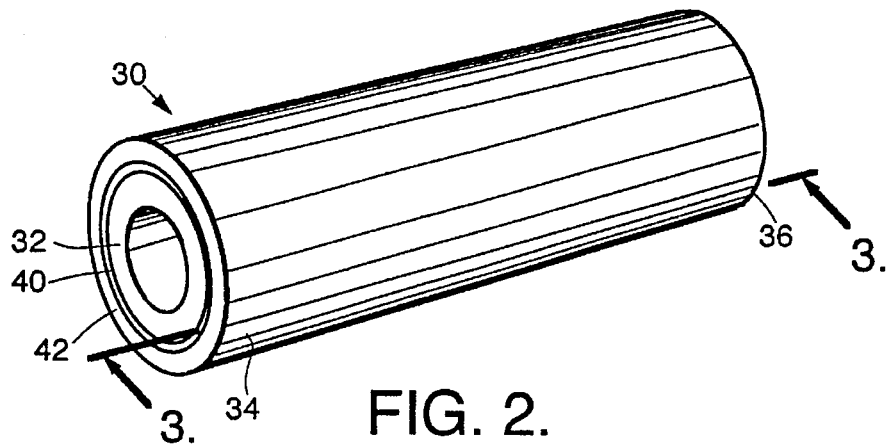
FIG. 2 is a perspective view of an optical fiber dispenser, with the attachment flange removed.
Figure 3:
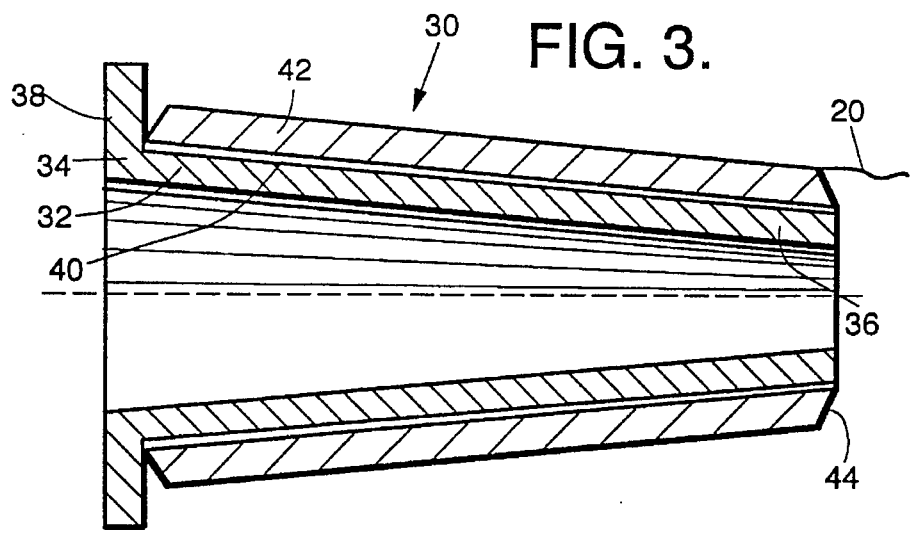
FIG. 3 is a schematic sectional view of the optical fiber dispenser of FIG. 2, taken on lines 3—3, but with the attachment flange present.

In one application, the optical fiber is stored on a dispenser 30 for later payout. As shown in FIGS. 2 and 3, the dispenser 30 includes a bobbin 32 in the shape of a tapered, hollow cylinder. The bobbin 32 must have sufficient structural strength to support the optical fiber that is wound thereon. The bobbin 32 may be made of a metal such as aluminum alloy, a nonmetal such as a graphite-epoxy composite, or, for certain applications of the present invention, a glass or ceramic that is transparent to ultraviolet radiation. The bobbin 32 is typically tapered by about 1–3 degrees from a first end 34 toward a second end 36 (which taper is exaggerated in FIG. 3 for the purposes of illustration), but the taper may be larger or smaller, or zero (in which case the bobbin is a straight-walled cylinder). An attachment flange 38 may be provided at the first end 34 of the bobbin 32 to facilitate the attachment of the bobbin 32, and thence the entire dispenser 30, to a support (not shown). The flange is removed in FIG. 2 to show the structure of the remainder of the dispenser more clearly, but is depicted in FIG. 3.

Overlying the tubular bobbin 32 is a base layer 40 that provides a base for the winding of the optical fiber thereon. The base layer 40 usually has a grooved outer surface into which the first layer of optical fiber is wound to provide firm seating for the first layer of optical fiber on the bobbin. The base layer 40 may be made of any suitable material, but one preferred construction of the base layer 40 is discussed subsequently.

An optical fiber pack 42 overlies the base layer 40 and thence the bobbin 32. The optical fiber pack 42 comprises a plurality of layers of optical fiber (cable) 20. Each layer of optical fiber is wound in turns in a side-by-side manner. After one layer of optical fiber is complete, the next layer is wound over the completed layer, and so on. At the end of each layer of optical fiber, there may be a small set back for the start of the next layer, producing a sloped end profile 44. An adhesive is utilized in conjunction with the winding of the optical fiber pack, as will be discussed in more detail subsequently.

Figure 4:
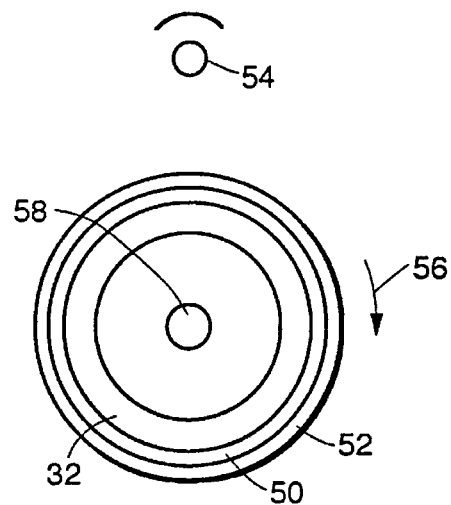
FIG. 4 is a schematic sectional view through an optical fiber dispenser like that of FIG. 2, perpendicular to the cylindrical axis, at a first intermediate stage of production.
Figure 5:
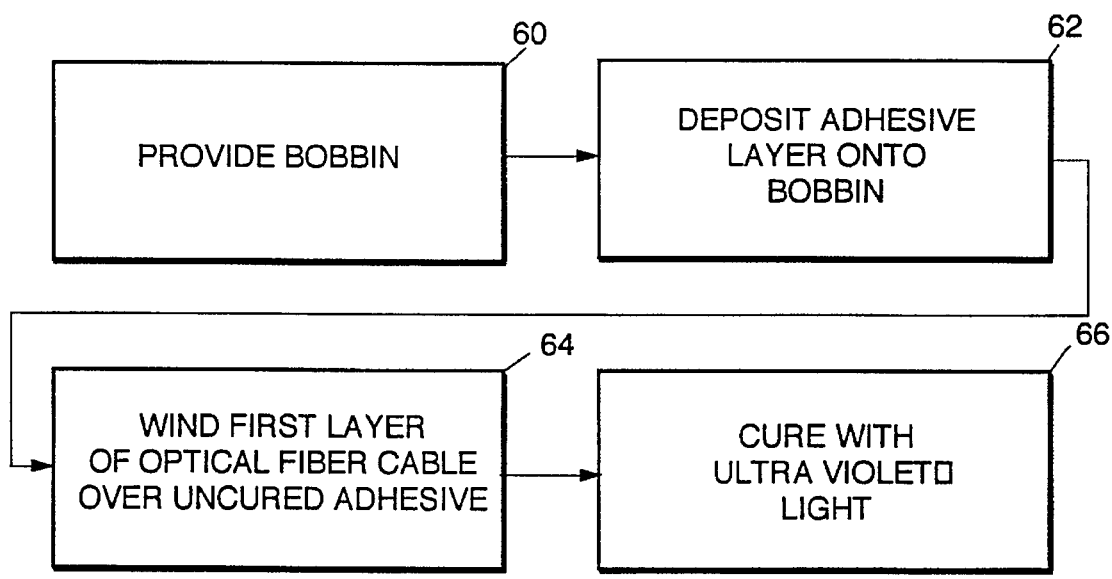
FIG. 5 is a block flow diagram for the preparation of a base layer made of the ultraviolet-curable adhesive.

FIG. 4 depicts a dispenser 30 at an intermediate stage of fabrication, during the preparation of the base layer 40. FIG. 5 depicts the method for preparing the dispenser 30 according to this embodiment of the invention. The bobbin 32 is provided, numeral 60. For this embodiment, the bobbin 32 is made of an ultraviolet-transparent material such as quartz glass. A layer 50 of an adhesive that is curable by ultravlolet radiation is deposited overlying the outer surface of the bobbin 32, numeral 62. The layer 50 is preferably about 27 micrometers thick. It may be applied by dipping the bobbin 32 into a mass of adhesive, coating, painting, or any other operable technique.

Adhesives that are curable by exposure to ultraviolet light are well known in the art for use in other applications. Such adhesives include, for example, polymerizable monomer components such as urethane acrylates or silicones with photoinitiators mixed therein. The photoinitiators are sensitive to ultraviolet radiation, such as that at 365 nanometers wavelength. When exposed to ultraviolet radiation, the photoinitiators produce free radicals that interact with the polymerizable monomer components, causing them to polymerize. Ultraviolet-curable adhesives are commercially available from a variety of manufacturers, for example DMS Desotech, Loctite Corp., P. D. George Co., Hernon Manufacturing Co., Norland Products, Inc., Master Bond, Inc., ICI Specialties, and Rhone-Poulenc. Some preferred ultraviolet-curable adhesives that have been used in preparing test dispensers using the approaches discussed herein include DMS Desotech Cablelite 3287-5-9; Loctite Corp. Shadow Cure 290 (18491); P. D. George Co. LS4845-1, 1149-103-43-1; Norland Products Inc. Optical Adhesive 75; Master Bond Inc. UV71DC and UV71DC-LV; and Rhone-Poulenc UV21381/AD and Rhodosil 21383LV.

Of these various adhesives, Rhone-Poulenc UV21381/AD was most preferred. This material is a polyorganosiloxane with acrylate groups on a polymer chain. In the uncured state it is a clear, viscous, tan liquid with a slight odor. After curing, it is a tan, soft solid with a shore "A" hardness of about 55.

The adhesive preferably is used without being dissolved in a solvent. That is, the adhesive as used in conjunction with all of the techniques described herein is preferably solventless and 100 percent reactive monomer. No solvent is present to potentially damage the buffer layer 28, nor is there any solvent that must be processed for environmental reasons.

A first layer 52 of optical fiber (specifically, optical fiber cable) is wound onto the layer 50 of uncured adhesive, numeral 64. As the optical fiber is wound into place, it displaces some of the uncured adhesive to fill the space between and conform to the adjacent turns of optical fiber. After subsequent curing, the adhesive adheres closely to the optical fiber, without voids.

The optical fiber can be any conventional type. For the embodiment shown in FIGS. 4–5, it is not necessary that the optical fiber be transparent to ultraviolet radiation if the bobbin 32 has been selected to be transparent to ultraviolet radiation. However, it is preferred that the optical fiber be transparent to ultraviolet radiation. For the embodiments of FIGS. 6–7 and 8–9, it is necessary that the optical fiber be at least moderately transparent to ultraviolet radiation.

Tests were conducted with several types of the best known optical fiber cables to determine their transmission of ultraviolet radiation at 365 nanometers wavelength. The optical fiber cables that were tested included 167 micrometer diameter Corning material using TA10 buffer, 238 micrometer diameter Corning material using TA20 buffer, 247 micrometer diameter Corning material using CPC5 buffer, and 241 micrometer diameter AT&T material using "D-Lux" buffer. All of these optical fiber cables had transmission through a single layer of at least 70 percent of the incident ultraviolet radiation, and transmission through 6 layers of optical fiber cable of at least 50 percent of the incident ultraviolet radiation. In the embodiments of FIGS. 4–5 and FIGS. 8–9, only the transmission through a single layer is pertinent. However, in one of the embodiments of FIGS. 6–7, the transmission through multiple layers is desirable.

After the first layer 52 of optical fiber is wound onto the adhesive layer 50, the adhesive layer is cured by directing ultraviolet radiation into the adhesive layer 50, numeral 66. In FIG. 4, two sources of the ultraviolet light are shown. The first is an external source 54, positioned above and separated from the dispenser being fabricated. Radiation from the source 54 reaches the adhesive layer 50 by passing through the first layer 52 of optical fiber. Uniformity of curing is achieved by using multiple sources 54, by using a series of reflectors, and/or by rotating the bobbin 32 past the source 54, as indicated by arrow 56. The second is an internal source 58 located inside the bobbin 32. Radiation from the second source 58 reaches the adhesive layer 50 by passing through the wall of the bobbin 32. The second source 58 is used only where the bobbin 32 is made of ultraviolet-transparent material.

The sources 54 and 58 are preferably Xenon RC500A ultraviolet lamps having a principal output at 365 nanometers. This type of lamp operates in a pulsed fashion that tends to heat the optical fiber less than does a continuous wave source such as a mercury vapor lamp. The time required for curing depends upon the positioning of the lamp, the thickness of the adhesive layer, the thickness of the overlying optical fiber layer, and other factors. Typically, however, the curing time is about 3 minutes when using a single external source 54 and rotating the bobbin past that source.

During curing, the adhesive layer 50 polymerizes to a hardened-yet-deformable state. In the case of the embodiment of FIGS. 4–5, the adhesive layer 50 becomes the base layer 40 discussed previously. The base layer formed in this manner is unique, as it is conformed precisely to the first layer of optical fiber. There is little opportunity for the optical fiber to slip or not fit precisely within the grooves defined in the base layer, because the grooves are themselves formed responsive to the optical fiber.

Figure 6:
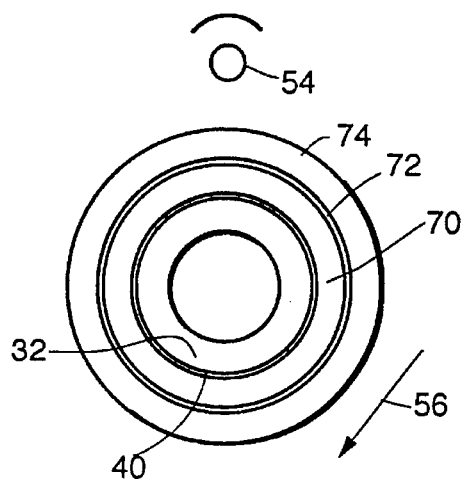
FIG. 6 is a schematic sectional view through an optical fiber dispenser like that of FIG. 2, perpendicular to the cylindrical axis, at a second intermediate stage of production.
Figure 7:
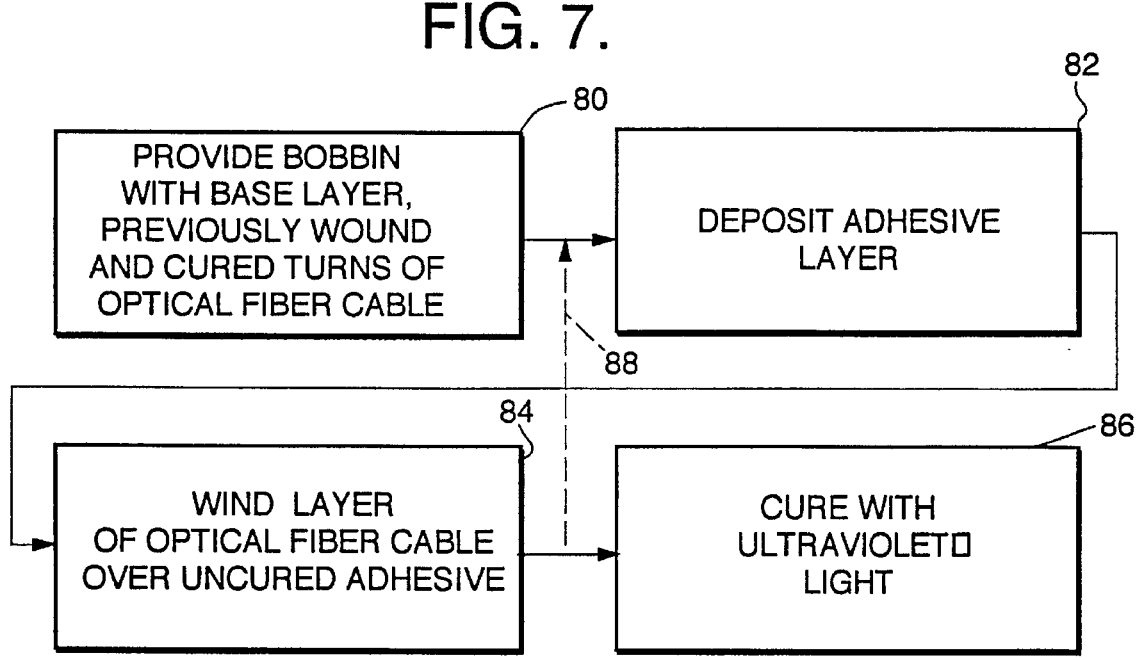
FIG. 7 is a block flow diagram for preparing a dispenser by depositing adhesive and optical fiber layers, with layered curing of the adhesive.

FIGS. 6–7 present another embodiment of the present invention. FIG. 6 depicts the dispenser at a second intermediate stage of production, numeral 80, further along than that shown in FIG. 4. The bobbin 22 and base layer 40 are in place. Additionally, a first portion 70 of the optical fiber pack has already been placed onto the bobbin 32 and base layer 40. FIG. 6 depicts the stage of preparation where additional layers of optical fiber are to be wound onto the first portion 70 of the optical fiber pack.

A layer 72 of the ultraviolet-curable adhesive is deposited, numeral 82. Deposition is accomplished preferably by squeezing the adhesive from a dispenser onto the surface of the first portion 70 of the optical fiber pack. The same ultraviolet-curable adhesive material discussed previously is preferably used. The layer 72 is quite thin, and because it lies in the hills and valleys of the previously deposited layer of optical fiber it cannot be readily described in terms of a thickness. Instead, the adhesive can be described as being present by a minimum amount necessary to completely wet the top of the previous optical fiber layer and by a maximum amount necessary to fill the interstitial voids and conform to the optical fiber after the next layer is wound over the uncured adhesive.

A layer 74 of optical fiber is wound overlying the layer 82 of uncured adhesive, numeral 84. The same optical fiber material as discussed previously is preferably used. The optical fiber layer 74 is wound in the conventional manner.

The adhesive of the layer 72 is cured by directing ultraviolet radiation through the overlying layer 74 of optical fiber, numeral 86. In this case, only the external source 54 is pictured as used in the curing operation. The partially completed dispenser is rotated past the source 54 to achieve uniform curing, as indicated by arrow 56. In practice, it is preferred to use multiple external sources 54 and associated reflectors to obtain a uniform external UV illumination. The internal source 58 could be used, but its curing effect would be greatly reduced by passage of the radiation through the base layer 40 and the first portion 70 of the optical fiber pack.

This procedure results in a layer 74 of optical fiber that is firmly adhered to the underlying first portion 70 of the optical fiber pack by the now-cured adhesive layer 72. The layer 74 fits well against and adheres to the underlying turns of optical fiber, as the adhesive layer 72 was soft and deformable when the layer 74 was wound. The deformable adhesive conforms to the overwound optical fiber layer 74 prior to curing, so that after curing there is good contact and minimal voids. Also, if there is any miswinding of the layer 74, rework is easily accomplished as long as the miswinding is detected and corrected before the curing step 86.

An alternative embodiment is also depicted by an iteration path 88 of FIG. 7. As noted, reasonably good transmission of ultraviolet radiation is achieved even through multiple overlying layers of the optical fiber. It is therefore possible to repeat the sequence of adhesive application 82 and optical fiber layer winding 84 several times, before proceeding to the curing step 86. That is, a first adhesive layer is deposited, numeral 82, and a first optical fiber layer is wound over that first adhesive layer, numeral 84. Then, following the iteration path 88, a second adhesive layer is deposited and a second optical fiber layer is wound over that second optical fiber layer. These iterations may be repeated several times. Once all of the winding is complete, the entire stack is cured, numeral 86. This approach is faster than that wherein one layer at a time is deposited and cured, but has the disadvantage that the different layers of adhesive will possibly be cured to different degrees due to attenuation of the ultraviolet radiation by the overlying layers.

FIGS. 8–9 depict the use of the present invention for tacking relatively short lengths of the optical fiber into place. As discussed previously, when each layer of optical fiber is complete, there is typically a step back to the start of the next layer. The gradual accumulation of these steps back results in the sloped end profile 44 at the ends of the optical fiber pack 42. As shown in FIG. 8, for example, a layer 90 of optical fiber is wound from left to right over the bobbin 32 (and over any underlying, previously deposited layers of optical fiber, not shown). When the layer 90 is complete, the next, overlying layer 92 is to be wound from right to left. The layer 92 does not start flush with the end of the layer 90, but instead is spaced back by a setback distance S. There is a transition region 94 through the setback distance S, as the optical fiber cable 20 passes from the layer 90 to the layer 92.

It has been a problem when conventional adhesives are used to maintain the position of the optical fiber within the transition region 94. The optical fiber is wound under tension, and there is therefore a tendency for the optical fiber in the transition to unwind from its set position. Conventional adhesives that harden only with a combination of temperature and time are not practical for use in holding the optical fiber in place through the transition region 94.

According to the present approach, a bobbin is provided with optical fiber already applied, numeral 100. Some portion of the optical fiber must be held in place to permit further processing. The end transitions present the most pressing need for this embodiment, but other uses are also possible. A bead 96 of ultraviolet-curable adhesive is deposited at the required location, numeral 102. In this case, the bead 96 is placed at the location of the transition region 94 where the optical fiber is to be held. The optical fiber cable 20 is contacted to the adhesive bead 95, numeral 104, and held in place. Ultraviolet light from the source 54 is applied to the adhesive bead 96 to harden the adhesive, numeral 106. A portion of the ultraviolet light reaches the adhesive bead 96 directly, while a portion passes through the optical fiber cable 20. The adhesive quickly hardens. After the adhesive is hardened, the optical fiber cable 20 is effectively tacked into place using the same adhesive that is used to hold the remainder of the layer in place. This embodiment utilizes the quick-curing capability of the ultraviolet adhesive. After the optical fiber in the transition region has been firmly placed, winding of the remainder of the layer 92 begins.

The present invention provides for the use of ultraviolet-curable adhesive to solve several problems in the fabrication of optical fiber dispensers. In each case, an overlying layer of optical fiber is in place before the underlying layer of adhesive is cured. This sequence avoids the difficulties that arise if the adhesive is first cured and then the optical fiber cable is wound over the stiffer layer of cured adhesive. The present invention also avoids the difficulties that arise using conventional curable adhesives.

The various embodiments of the invention need not be used together, but can be us ed separately or in combination with conventional techniques. For example, in some cases it may be desirable to fabricate the base layer according to the procedure of FIGS. 4–5. Then the optical fiber pack can be fabricated using conventional adhesive materials. Tacks at end transitions can be made using the embodiment of FIGS. 8–9. Other combinations of the present approach and conventional techniques are also contemplated. The present invention is compatible with conventional techniques of dispenser construction. In such mixed fabrication techniques, it is only required that care be taken to be certain that the cured properties of the conventional adhesive and the cured properties of the ultraviolet-curable adhesive are reasonably well matched to avoid discontinuities of payout characteristics.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing an optical fiber dispenser, comprising the steps of providing a bobbin; and forming an optical fiber pack having layers of optical fiber on the bobbin, the step of forming including the steps of depositing an adhesive layer of an adhesive curable by ultraviolet radiation, winding a length of the optical fiber over the layer of ultraviolet-curable adhesive to form an overlying optical fiber layer, and directing ultraviolet radiation at the adhesive layer through the overlying optical fiber layer, to cure the adhesive.

2. The method of claim 1, wherein the step of depositing an adhesive layer includes the step of depositing a layer of a material including a polymerizable material selected from the group consisting of a urethane acrylate and a silicone.

3. The method of claim 1, wherein the step of winding includes the step of winding a portion of the overlying optical fiber layer overlying the adhesive layer, and wherein the step of directing includes the step of directing ultraviolet radiation substantially immediately after the step of winding a portion, to tack the portion of overlying optical fiber layer into place.

4. The method of claim 1, wherein the step of winding includes the step of winding an entire overlying optical fiber layer over the adhesive layer, prior to commencing the step of directing ultraviolet radiation.

5. The method of claim 1, wherein the steps of depositing and winding are repeated sequentially at least twice, prior to commencing the step of directing ultraviolet radiation.

6. The method of claim 1, wherein the step of depositing a layer includes the step of depositing a layer of the ultraviolet-curable adhesive onto the surface of the bobbin.

7. The method of claim 1, wherein the step of providing a bobbin includes the step of providing a bobbin that is transparent to ultraviolet radiation.

8. The method of claim 7, wherein the step of directing ultraviolet radiation includes the step of directing ultraviolet radiation through the bobbin.

9. The method of claim 1, wherein the step of depositing an adhesive layer includes the step of providing a substantially solventless ultraviolet-curable adhesive.

10. An optical fiber dispenser prepared by the method of claim 1.

11. A method for preparing an optical fiber dispenser, comprising the steps of providing a bobbin; and forming an optical fiber pack having layers of optical fiber on the bobbin, the step of forming including the steps of depositing an adhesive layer of a solventless adhesive curable by ultraviolet radiation, winding an entire overlying layer of the optical fiber over the adhesive layer, and directing ultraviolet radiation at the adhesive layer to cure the adhesive, the step of directing to occur after completion of the step of winding.

12. The method of claim 11, including the additional step of sequentially repeating the steps of depositing and winding at least twice, prior to commencing the step of directing ultraviolet radiation.

13. The method of claim 11, wherein the step of depositing an adhesive layer includes the step of depositing a layer of a material including a polymerizable material selected from the group consisting of a urethane acrylate and a silicone.

14. The method of claim 11, wherein the step of directing ultraviolet radiation includes the step of directing ultraviolet radiation through the layer of optical fiber wound over the adhesive layer.

15. An optical fiber dispenser prepared by the method of claim 11.

16. A method for preparing an optical fiber dispenser, comprising the steps of providing a bobbin; and forming an optical fiber pack having layers of optical fiber on the bobbin, the step of forming including the steps of depositing an adhesive region of a solventless adhesive curable by ultraviolet radiation, winding an end region of an optical fiber layer over the adhesive region, and directing ultraviolet radiation at the adhesive region through the end region of optical fiber immediately after the step of winding is complete, to cure the adhesive in the adhesive region and tack the end region of the optical fiber layer in place;

completing the winding of a respective layer of optical fiber.

17. The method of claim 16, wherein the step of depositing an adhesive region includes the step of depositing a layer of a material including a polymerizable material selected from the group consisting of a urethane acrylate and a silicone.

18. An optical fiber dispenser prepared by the method of claim 16.

* * * * *